United States Patent Office 3,153,043
Patented Oct. 13, 1964

3,153,043
1-NAPHTHYLMETHYL-2-LOWER ALKYL-1,2,3,4-TETRAHYDROISOQUINOLINES
Jerry A. Weisbach, Cherry Hill, N.J., assignor to Smith Kline & French Laboratories, Philadelphia, Pa., a corporation of Pennsylvania
No Drawing. Filed Sept. 4, 1963, Ser. No. 306,636
3 Claims. (Cl. 260—288)

This invention relates to new 1-naphthylmethyl-2-lower alkyl-1,2,3,4-tetrahydroisoquinolines having pharmacodynamic activity. More specifically the new compounds of this invention have antipyretic and central nervous system depressant activity. In addition, compounds of this invention are useful as intermediates in the preparation of the N-lower alkyl-3,4-benzonoraporphines of my copending application Serial No. 229,992.

The new isoquinoline derivatives of this invention are represented by the following structural formula:

Formula I

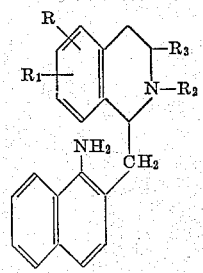

when:

R represents hydrogen or lower alkoxy, preferably methoxy;
$R_1$ represents hydrogen, lower alkoxy, preferably methoxy or, when taken together with R, methylenedioxy;
$R_2$ represents lower alkyl and
$R_3$ represents hydrogen or lower alkyl.

The terms "lower alkyl" and "lower alkoxy" where used herein denotes groups having 1–4 carbon atoms.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition, this invention includes pharmaceutically acceptable, nontoxic quaternary ammonium salts of the above defined bases formed with, for example, a reactive lower alkyl halide, sulfate, p-toluene sulfonate, benzene sulfonate or lower alkyl sulfonate.

The 1-naphthylmethyl-2-lower alkyl-1, 2, 3, 4-tetrahydroisoquinolines of this invention are prepared by condensing an isoquinolinium salt with 1-nitro-2-methylnaphthalene in alcoholic base such as sodium alkoxide in a lower alkanol. The reaction is carried out at about 18–45° C., conveniently at room temperature, to give the 1-(1'-nitro-2'-naphthal)-2-lower alkyl-1,2,3,4-tetrahydroisoquinoline intermediate. Hydrogenation of this intermediate in lower alkanol solution in the presence of a catalyst such as platinum oxide or palladium-in-charcoal gives the 1-(1'-amino-2'-naphthylmethyl)-2-lower alkyl-1,2,3,4-tetrahydroisoquinoline.

Alternatively, the 1-(1'-amino-2'-naphthylmethyl)-2-lower alkyl-1,2,3,4-tetrahydroisoquinolines of this invention are prepared by condensing a 3-substituted phenethylamine or an α-lower alkyl derivative thereof with 1-nitro-2-naphthalene acetyl chloride to give an amide which is cyclized by the Bischler-Napieralski reaction using a dehydrating agent such as phosphorus oxychloride in an anhydrous hydrocarbon solvent such as benzene or toluene at elevated temperature, conveniently at the reflux temperature of the reaction mixture, for a reaction period of about 15–120 minutes.

The resulting 1-(1'-nitro-2'-naphthylmethyl)-3,4-dihydroisoquinoline is treated with a lower alkyl halide to give the corresponding N-lower alkyl isoquinolinium halide. Reduction of this intermediate with a bimetallic hydride such as sodium borohydride and treatment of the product with zinc dust and sulfuric acid gives the 1 - (1'-amino-2'-naphthylmethyl)-2-lower alkyl-1,2,3,4-tetrahydroisoquinoline.

Cyclization by the Pschorr procedure of a 1-(1'-amino-2'-naphthylmethyl)-2-lower alkyl - 1,2,3,4 - tetrahydroisoquinoline dihydrochloride, prepared by treating the base with excess ethereal hydrogen chloride, gives the N-lower alkyl-3,4-benzonoraporphines having pharmacodynamic activity.

The following examples are not limiting but are illustrative of compounds of this invention.

Example 1

Isoquinoline methiodide (100 g.) and 70 g. of 2-methyl-1-nitronaphthalene are added to a warm ethanol solution of sodium (25 g.). The resulting solution is kept at 25° C. for 24 hours and filtered to yield solid material which is recrystallized from methanol to give 1-(1'-nitro-2'-naphthal)-2-methyl-1,2,3,4-tetrahydroisoquinoline.

A mixture of 26.1 g. of 1-(1'-nitro-2'-naphthal)-2-methyl-1,2,3,4-tetrahydroisoquinoline, 4.0 g. of platinum oxide and 300 ml. of absolute ethanol is hydrogenated for 25 minutes. After filtration and concentration in vacuo, there is obtained, as the residue, 1-(1'-amino-2'-naphthylmethyl)-2-methyl-1,2,3,4-tetrahydroisoquinoline which on treatment with ethyl acetate-etheral hydrogen chloride, filtration and recrystallization from methanol-ethanol gives the dihydrochloride salt.

Example 2

A mixture of 18.1 g. of 3,4-dimethoxyphenethylamine and 24.9 g. of 1-nitro-2-naphthalene acetyl chloride in 300 ml. of benzene and 30 ml. 10% sodium hydroxide is stirred for two hours and filtered to give 1-nitro-2-naphthyl-N-(3',4'-dimethoxyphenethyl)acetamide.

Ten grams of the above prepared acetamide is treated with 15 ml. of phosphorus oxychloride in toluene. The mixture is refluxed for one hour, then cooled and treated with light petroleum to separate a layer which is decanted. The residue is treated with water and ammonia solution and extracted into chloroform. The chloroform extract is concentrated in vacuo to give 1-(1'-nitro-2'-naphthylmethyl)-6,7-dimethoxy-3,4-dihydroisoquinoline.

The resulting 3,4-dihydro-6,7-dimethoxy-1-(1'-nitro-2'-naphthylmethyl)isoquinoline is treated with methyl iodide in benzene to give, after heating on a steam bath, cooling and evaporating the solvent, 1-(1'-nitro-2'-naphthylmethyl)-2-methyl-6,7-dimethoxy-3,4-dihydroisoquinolinium iodide.

To a warm stirred solution of 10.0 g. of the above prepared isoquinolinium iodide derivative in methanol is added 5.0 g. of sodium borohydride. The mixture is stirred for one hour, evaporated to dryness in vacuo and treated with chloroform and water. The chloroform layer is washed with water and with saturated sodium chloride solution and dried over sodium sulfate. The solvent is removed in vacuo. The residue is triturated with absolute ethanol to yield a solid which on recrystallization from ethanol gives 1-(1'-nitro-2'-naphthylmethyl)-2-methyl-6,7-dimethoxy-1,2,3,4-tetrahydroisoquinoline. Reduction of the nitro group is accomplished by treating with zinc dust and sulfuric acid at 15° C. The mixture is filtered, made alkaline with ammonia and extracted with chloroform. Evaporating the extract to dryness and recrystallizing the residue from ethanol gives 1-(1'-amino-2'-naphthylmethyl)-2-methyl-6,7-dimethoxy-1,2,3,4-tetrahydroisoquinoline.

*Example 3*

By the procedure of Example 2, 3,4-methylenedioxyphenethylamine is reacted with 1-nitro-2-naphthalene acetyl chloride to give 1-nitro-2-naphthyl-N-(3',4'-methylenedioxyphenethyl)acetamide which is treated with phosphorous oxychloride in toluene to yield 1-(1'-nitro-2'-naphthylmethyl)-6,7-methylenedioxy-3,4-dihydroisoquinoline.

Treating the above prepared dihydroisisoquinoline with methyl iodide and treating the resulting methyl isoquinolinium iodide with sodium borohydride in methanol followed by reduction of the nitro group using zinc dust and sulfuric acid gives 1-(1'-amino-2'-naphthylmethyl)-2-methyl-6,7-methylenedioxy-1,2,3,4-tetrahydroisoquinoline.

Treating the above prepared base with methyl iodide in ethanol gives the methiodide salt. Similarly reacting the base with ethyl p-toluenesulfonate in ethanol gives the ethyl p-toluenesulfonate salt.

*Example 4*

By the procedure of Example 1 using N-ethyl isoquinolinium iodide and N-n-propyl isoquinolinium iodide in place of isoquinolinium methiodide of Example 1, 1-(1'-amino-2'-naphthylmethyl)-2-ethyl-1,2,3,4-tetrahydroisoquinoline and the corresponding 2-n-propyl derivative are obtained.

*Example 5*

According to the procedure of Example 1, 5-methoxy-N-methylisoquinolinium iodide is reacted with 2-methyl-1-nitronaphthalene to give 1-(1'-nitro-2'-naphthal)-5-methoxy-2-methyl-1,2,3,4-tetrahydroisoquinoline which is hydrogenated in ethanol using a platinum oxide catalyst to give 1-(1'-amino-2'-naphthylmethyl)-5-methoxy-2-methyl-1,2,3,4-tetrahydroisoquinoline.

Similarly using 7-methoxy-N-methylisoquinolinium iodide as the starting material 1-(1'-amino-2'-naphthylmethyl)-7-methoxy-1,2,3,4-tetrahydroisoquinoline is obtained.

*Example 6*

A mixture of 13.5 g. of α-methylphenethylamine and 25.0 g. of 1-nitro-2-naphthalene acetyl chloride in benzene and 10% sodium hydroxide is stirred for two hours and filtered to give 1-nitro-2-naphthyl-N-(α-methylphenethyl)-acetamide.

By the procedure of Example 2, the aboxe prepared acetamide is treated with phosphorus oxychloride in toluene to give 1-(1'-nitro-2'-naphthylmethyl)-3-methyl-3,4-dihydroisoquinoline which is treated with methyl iodide in benzene to give 1-(1'-nitro-2'-naphthylmethyl)-2,3-dimethyl-3,4-dihydroisoquinolinium iodide. This 3,4-dihydro compound is treated with sodium borohydride in methanol followed by reduction with zinc dust and sulfuric acid to give 1-(1'-amino-2'-naphthylmethyl)-2,3-dimethyl-1,2,3,4-tetrahydroisoquinoline which on treatment with an excess of maleic acid in ethyl acetatee gave the dimaleate salt.

This application is a continuation-in-part of Serial No. 229,992 filed October 11, 1962.

What is claimed is:

1. A compound of the class consisting of a free base and its nontoxic, pharmaceutically acceptable, acid addition and quaternary ammonium salts, the free base having the formula:

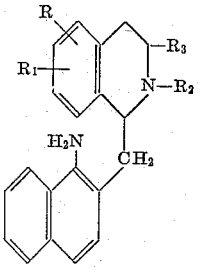

in which:

R is a member selected from the group consisting of hydrogen and lower alkoxy;

$R_1$ is a member selected from the group consisting of hydrogen, lower alkoxy and, when taken together with R, methylenedioxy;

$R_2$ is lower alkyl and $R_3$ is a member selected from the group consisting of hydrogen or lower alkyl.

2. A compound of the formula:

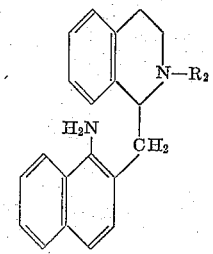

in which $R_2$ is lower alkyl.

3. 1-(1'-amino-2'-naphthylmethyl)-2-methyl-1,2,3,4-tetrahydroisoquinoline.

No references cited.